United States Patent
Bragagna et al.

(10) Patent No.: US 8,833,705 B2
(45) Date of Patent: Sep. 16, 2014

(54) CONDUIT HANGER WITH A LOAD-DISTRIBUTION PLATE

(75) Inventors: Elio Bragagna, Duens (AT); Christoph Wiedner, Feldkirch (AT); Ralph Lippuner, Buchs (CH); Marc Nutzmann, Lindau (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/394,710

(22) PCT Filed: Aug. 24, 2011

(86) PCT No.: PCT/EP2011/064522
§ 371 (c)(1),
(2), (4) Date: Mar. 7, 2012

(87) PCT Pub. No.: WO2012/055601
PCT Pub. Date: May 3, 2012

(65) Prior Publication Data
US 2012/0160970 A1 Jun. 28, 2012

(30) Foreign Application Priority Data
Oct. 25, 2010 (DE) .......................... 10 2010 042 860

(51) Int. Cl.
*E21F 17/02* (2006.01)
*F16L 3/11* (2006.01)
*F16L 59/135* (2006.01)

(52) U.S. Cl.
CPC *F16L 59/135* (2013.01); *F16L 3/11* (2013.01)
USPC .................... 248/62; 248/58; 248/65; 248/73

(58) Field of Classification Search
USPC ........... 248/62, 58, 61, 65, 73, 74.3; 138/106, 138/107, 110, 149, 157; 403/16, 240, 316
See application file for complete search history.

(56) References Cited

U.S. PATENT DOCUMENTS

| | | | |
|---|---|---|---|
| 3,653,618 A | 4/1972 | Kindorf et al. | 248/58 |
| 4,017,046 A * | 4/1977 | Hicks | 248/55 |
| 5,192,039 A * | 3/1993 | Williams | 248/62 |
| 6,138,960 A | 10/2000 | Carbonare et al. | 248/62 |
| 6,224,025 B1 * | 5/2001 | Alvarez | 248/58 |
| 6,283,158 B1 | 9/2001 | Botsolas et al. | 138/110 |
| 6,691,742 B1 * | 2/2004 | Cooper | 138/106 |

(Continued)

FOREIGN PATENT DOCUMENTS

DE 10 2009 045 484 4/2011

*Primary Examiner* — Todd M Epps
(74) *Attorney, Agent, or Firm* — Davidson, Davidson & Kappel, LLC

(57) ABSTRACT

A conduit hanger with at least one bracket element to receive a pipe, with a load-distribution plate that is placed into the bracket element, and with a fastening device for fastening the load-distribution plate to the bracket element. The fastening device has at least one catching element to grip the bracket element as well as a counter-bearing element, which are arranged offset on the load-distribution plate in the lengthwise direction of the plate, and between which a holding space is formed for the bracket element, and that the front of the bracket element has at least one recess that corresponds to the catching element so that the bracket element can be placed into the holding space.

16 Claims, 2 Drawing Sheets

(56) References Cited

U.S. PATENT DOCUMENTS

| | | | |
|---|---|---|---|
| 6,959,898 B1 | 11/2005 | Laughlin et al. | 248/60 |
| 7,284,728 B2 * | 10/2007 | Connolly | 248/62 |
| 7,677,505 B2 * | 3/2010 | Deichman | 248/58 |
| 7,793,893 B2 * | 9/2010 | Opperthauser | 248/62 |
| 2004/0200936 A1 | 10/2004 | Opperthauser | 248/62 |
| 2008/0203239 A1 | 8/2008 | Deichmann | 248/58 |
| 2010/0140420 A1 | 6/2010 | Deichman | 248/58 |
| 2011/0084178 A1 | 4/2011 | Wiedner et al. | 248/62 |

* cited by examiner

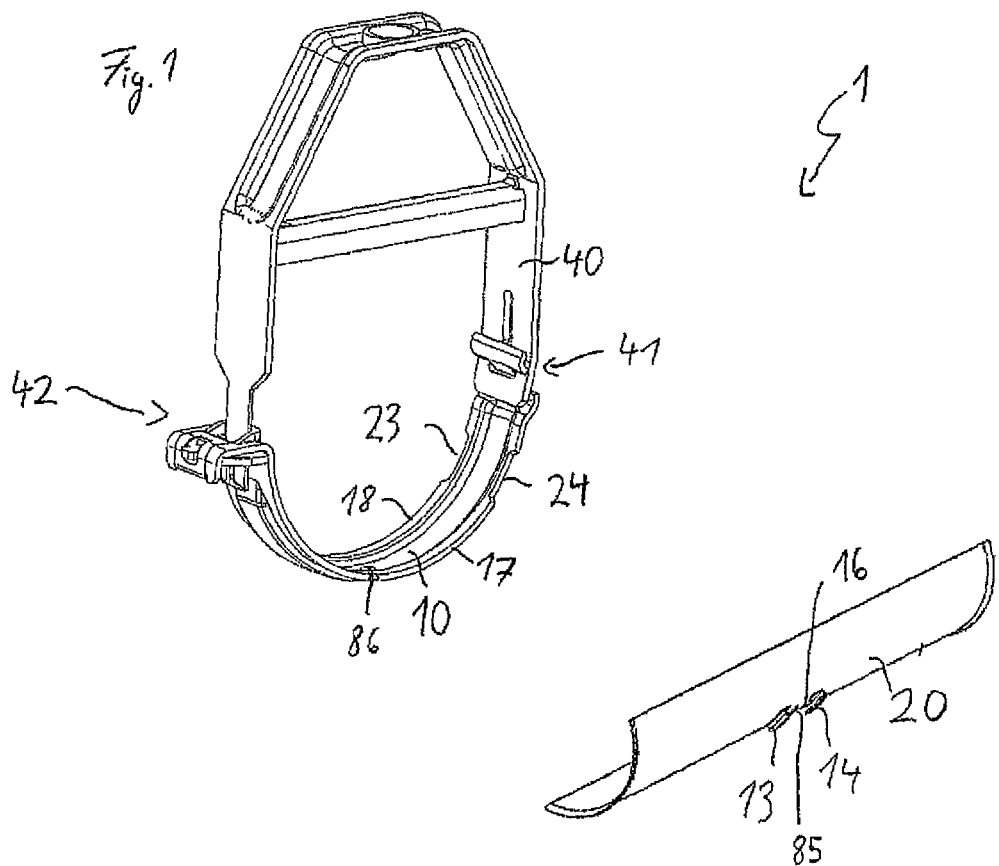
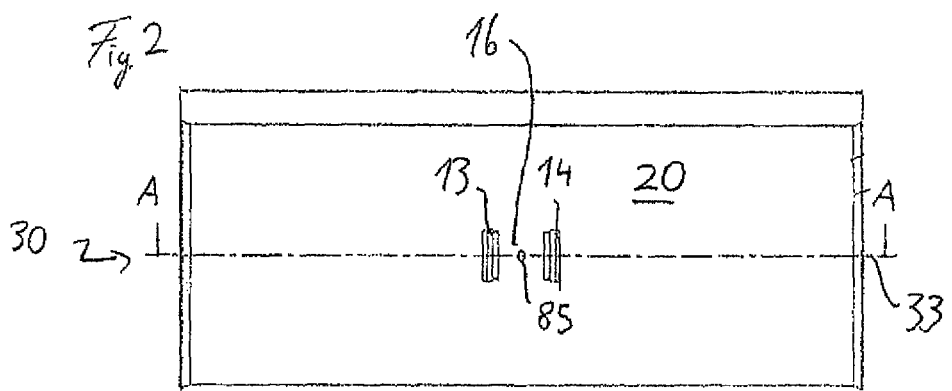
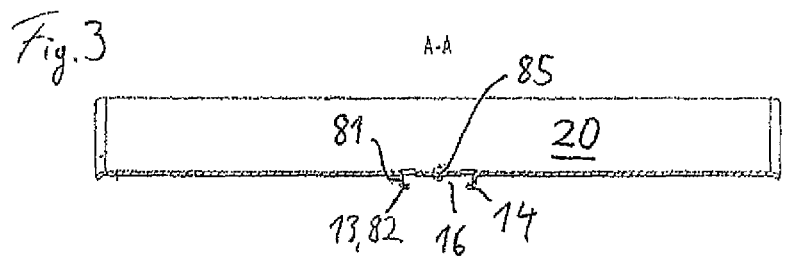

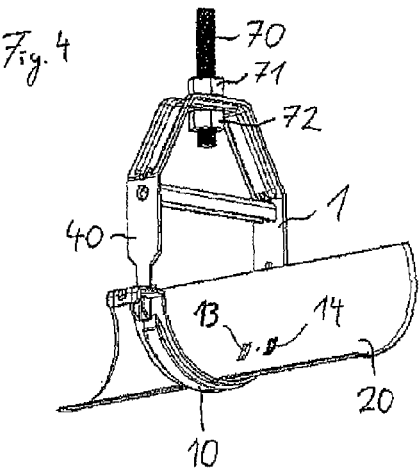
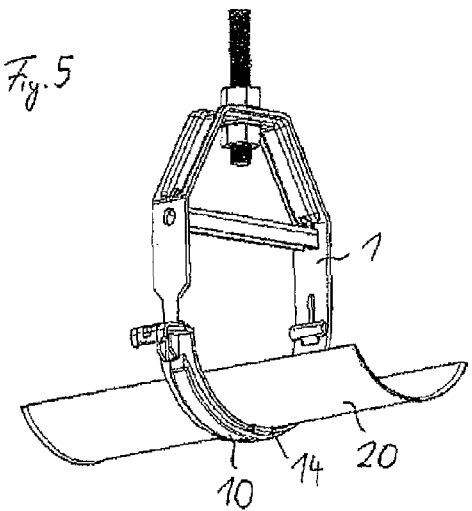
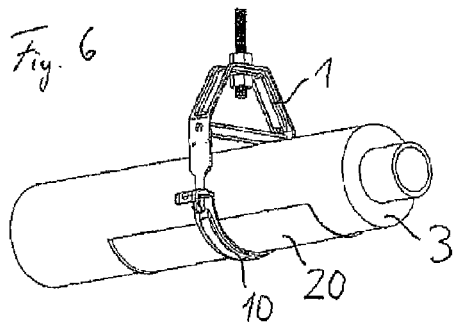
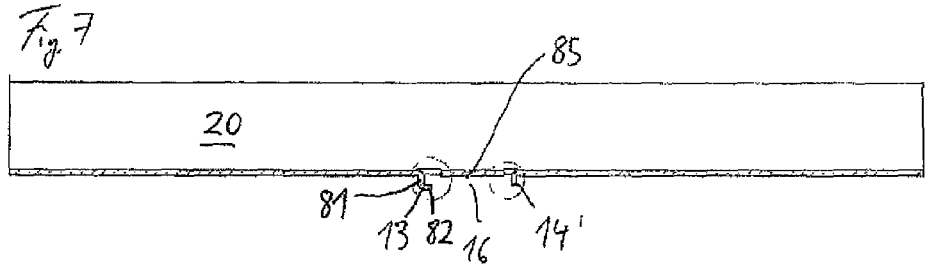

1

CONDUIT HANGER WITH A LOAD-DISTRIBUTION PLATE

The invention relates to a conduit hanger with a load-distribution plate, especially for suspending a pipe from a ceiling. Such a hanger is configured with at least one bracket element to hold a pipe, with a load-distribution plate that is placed into the bracket element, and with a fastening device for fastening the load-distribution plate to the bracket element.

BACKGROUND

For instance, U.S. Pat. No. 6,138,960 A describes conduit hangers for hanging a pipe from a ceiling. Such conduit hangers have bracket elements in which the pipe is held.

In order for the load-bearing force of conduit hangers to be introduced over a large surface area into the pipe or into the insulation that surrounds the pipe, U.S. Pat. No. 3,653,618, for example, discloses placing a load-distribution plate into the bracket element of the conduit hanger, and the pipe, in turn, is laid onto said load-distribution plate. A load-distribution plate of the generic type enlarges the contact surface area and thus reduces the pressure that is exerted upon the pipe. U.S. Pat. No. 3,653,618 teaches that such a load-distribution plate can be centered by means of a tab that can be adjusted in the bracket element.

U.S. patent application 2010/140420A discloses affixing a load-distribution plate by a press fit between two reinforcement ribs. U.S. Pat. No. 6,224,025B discloses a system in which the load-distribution plate can be snapped in place. U.S. patent application 2004/0200936A1 describes a conduit hanger in which an insulating element is arranged in the bracket element that supports the pipe. This insulating element is secured by means of two tabs on the bracket element that engage with corresponding recesses in the bracket element.

U.S. Pat. No. 4,017,046 relates to a support saddle for pipes that has flange elements surrounding a shoe.

Another arrangement of a load-distribution plate is described in the subsequently published German document DE 10 2009 045484.

SUMMARY OF THE INVENTION

It is an object of the present to provide a conduit hanger that can be installed very easily and reliably.

The present invention provides a conduit hanger characterized in that the fastening device has at least one catching element to grip the bracket element as well as a counter-bearing element, which are arranged offset on the load-distribution plate in the lengthwise direction of the plate, and between which a holding space is formed for the bracket element, and in that the front of the bracket element has at least one recess that corresponds to the catching element so that the bracket element can be placed into the holding space.

The invention is based on a load-distribution plate that can be fastened to the bracket element of the conduit hanger. According to the invention, this fastening technique is realized by at least one catch that can be inserted into a corresponding recess in the bracket element by means of a movement that is radial to the bracket element, whereby this catch is locked in place by means of a rotation tangential to the bracket element, similarly to a bayonet catch.

In order to prevent an undesired situation in which the load-distribution plate is dislodged by being rotated around an axis running perpendicular to the longitudinal axis of the load-distribution plate, a counter-bearing element is provided in a lengthwise offset position (relative to the longitudinal axis of the load-distribution plate and the bracket element) with respect to the catching element. When the bracket element has been put in place, the catching element is positioned on the front face and the counter-bearing element on the rear face of the bracket element, that is to say, the catching element and the counter-bearing element form a holding space where the bracket element is accommodated when it is in the locked state. In this holding space, the bracket element is enclosed from the top by the load-distribution plate, from the front as well as from below by the catching element, and from the rear by the counter-bearing element. This enclosure on all four sides prevents the undesirable situation in which the load-distribution plate could be dislodged by being rotated.

Due to its shape with a first leg from which a second, free leg protrudes at an angle, the catching element could also be referred to as a hook element. According to the invention, the free leg of the catching element faces the counter-bearing element.

The load-distribution plate serves to distribute the force exerted by the bracket element onto an installed pipe over the surface area of the plate. In particular, the load-distribution plate can have a holding space for the pipe in the form of a segment of the outer surface of a cylinder. The bracket element can especially be a lower bracket. The catching element and/or the counter-bearing element are arranged according to the invention on the underside of the load-distribution plate, in other words, on the side of the load-distribution plate that faces away from the holding space for the pipe.

In order to facilitate the placement of the bracket element into the holding space at different angular positions, the bracket element can also have several recesses on its front that correspond to the catching element in order to place the bracket element into the holding space. It is also possible to provide several catching elements and/or counter-bearing elements, as a result of which an even better defined joining of the bracket element to the load-distribution plate can be obtained.

The counter-bearing element can have, for instance, a smooth contact surface facing the holding space. For example, the counter-bearing element can be configured as a tab that projects from the underside of the load-distribution plate. However, it is especially preferred for the counter-bearing element to be a second catching element to grip the bracket element, and for the bracket element to have at least one recess on each of its two opposing faces, whereby the two recesses correspond to the two catching elements for purposes of placing the bracket element into the holding space. According to this embodiment, the load-distribution plate is held on both faces of the bracket element by means of at least one catching element, translating into a very reliable fastening. According to the invention, the two catching elements are open in opposite directions, so that each of their free legs are located on the underside of the holding space for the bracket element. For the insertion of the two catching elements, the bracket element has two corresponding recesses at the front.

With an eye towards achieving symmetry of the forces, for instance, it is particularly advantageous for the catching element and/or the counter-bearing element to be arranged in an apex area of the load-distribution plate. The expression "apex area" can especially refer to the area that lies circumferentially in the middle of the cylindrical segment-like plate. The arrangement on the apex area yields a symmetrical configuration of the load-distribution plate.

It is also preferred for the catching element and the counter-bearing element to lie on a line that runs in the longitudinal direction of the load-distribution plate. According to this embodiment, the two elements as seen in the viewing direction from the front—in other words, in the viewing direction perpendicular to the front faces of the load-distribution plate and/or of the bracket element—are located one behind the other. As a result, the fastening means has a very compact holding space that counteracts tilting of the load-distribution plate relative to the bracket element. The term longitudinal axis, which defines the longitudinal direction, can especially refer to an axis around which the bracket element and/or the plate runs.

A refinement of the invention that is advantageous, especially in terms of the production work, lies in the fact that the catching element and the counter-bearing element are configured in one piece with the load-distribution plate. If the load-distribution plate is a metal plate, the elements can be produced by means of stamping-bending. If the load-distribution plate is made of a plastic material, the elements can be created, for example, by means of an injection-molding process.

Furthermore, it is advantageous for the catching element and the counter-bearing element to have corresponding centering means. For example, a centering projection can be provided on the load-distribution plate and a corresponding centering hole can be provided on the bracket element. As an alternative or in addition thereto, it is also possible to provide a centering projection on the bracket element and a corresponding centering hole on the load-distribution plate.

BRIEF DESCRIPTION OF THE DRAWINGS

The invention is explained in greater detail below on the basis of preferred embodiments that are schematically depicted in the accompanying figures. The following is shown:

FIG. 1—a conduit hanger according to the invention, before the load-distribution plate has been placed into the bracket element;

FIG. 2—a view of the load-distribution plate according to FIG. 1, from below;

FIG. 3—a cross-sectional view A-A of the load-distribution plate from FIG. 2;

FIGS. 4-6—a sequence showing the assembly of the conduit hanger from FIG. 1 and the subsequent placement of a pipe; and FIG. 7—another embodiment of a conduit hanger according to the invention, in a view analogous to that of FIG. 3.

DETAILED DESCRIPTION

An embodiment of a conduit hanger 1 according to the invention is shown in FIGS. 1 to 6. The conduit hanger 1 has a first bracket element 10 that forms a lower bracket, as well as a second bracket element 40 that forms an upper bracket. The first bracket element 10 is configured for the placement of a pipe 3 (see FIG. 6) and it has a cylindrical inner contour that matches the pipe 3. As shown especially in FIG. 1, the first bracket element 10 is connected to the second bracket element 40 on the one hand by means of a hinge 41, e.g. a bolt hinge and, on the other hand, by means of a closure mechanism 42.

The conduit hanger 1 also has a load-distribution plate 20. This load-distribution plate 20 can be placed into the lower bracket element 10 and it has a cylindrical holding space into which, in turn, the pipe 3, especially with its insulation, can be laid. The load-distribution plate 20 can distribute the bearing loads over a larger surface area than the bracket element 10 alone. The placement of the load-distribution plate 20 between the lower bracket element 10 and the pipe 3 thus prevents damage to the pipe 3 caused, for instance, when its insulation is torn open or when the conduit hanger 1 digs into the insulation.

The conduit hanger 1 can, as shown in FIG. 5, be employed, for example, in the realm of installation technology for the single-point fastening of a pipe 3 used for heating, hot water, fresh water, sewage, etc. As shown in FIGS. 4 to 6, the conduit hanger 1 can be fastened to a threaded rod 70 which, in turn, can be suspended from a ceiling. In the example shown, the conduit hanger 1 is fastened to the threaded rod 70 by means of two nuts 71, 72 that are self-locking, so that the upper bracket element 40 of the conduit hanger 1 is firmly fixed in place by the threaded rod 70.

In order to fasten the load-distribution plate 20 to the lower bracket element 10, the lower side of the load-distribution plate 20, facing away from the holding space for the pipe 3, has a catching element 13 as well as a counter-bearing element 14 that is likewise configured as a catching element in the present embodiment. The two elements 13, 14 enclose a holding space 16 for the lower bracket element 10. The two elements 13, 14 are arranged centrically on the load-distribution plate 20 in an apex area 30 of the load-distribution plate 20 and they project downwards from the load-distribution plate 20. As is particularly shown in FIG. 3, the two elements 13 and 14 each have a first leg 81 that projects, preferably perpendicularly, from the load-distribution plate 20, as well as a second leg 82 that adjoins the first leg 81 at an angle and that faces the other element 14 or 13, respectively.

As shown especially in FIG. 1, the lower bracket element 10 has a recess 23 and 24 on each of its opposing faces 18 and 17, respectively. These recesses 23 and 24 correspond to the elements 13 and 14 of the load-distribution plate 20. The recesses 23, 24 make it possible to slip the two elements 13 and 14 of the load-distribution plate 20 onto the bracket element 10, even though the bracket element 10 is actually so wide that it is surrounded by the elements 13 and 14.

The assembly procedure for the load-distribution plate 20 at the lower bracket element 10 is shown in FIGS. 4 to 6. At first, as depicted in FIG. 4, the load-distribution plate 20 is arranged in such a way that the two elements 13 and 14 are flush with the recesses 23 and 24, and the bracket element 10 is placed into the holding space 16. Then, as depicted in FIG. 5, the load-distribution plate 20 is rotated relative to the bracket element 10, namely, around an axis of rotation that runs parallel to the longitudinal axis 33 of the load-distribution plate 20 shown in FIG. 2. In this process, the elements 13 and 14 are offset with respect to the recesses 23 and 24, which locks the bracket element 10 onto the load-distribution plate 20. As depicted in FIG. 6, the pipe 3, which is provided with insulation, can then be laid onto the load-distribution plate 20.

As shown especially in FIG. 2, the two elements 13 and 14 are arranged next to each other, that is to say, they are on a line running parallel to the longitudinal axis 33. Whereas the two elements 13 and 14 are arranged centrically in the apex area 30 of the load-distribution plate 20, the two corresponding recesses 23 and 24 are arranged on the lower bracket element 10 eccentrically and outside of the apex area of the lower bracket element 10. The result is that the load-distribution plate 20 is then locked when the load-distribution plate 20 and the bracket element 10 are in a symmetrical, centered arrangement.

Especially as shown in FIGS. 1 and 2, the lower bracket element 10 has a centered hole 86 and the load-distribution plate 20 has a corresponding centered projection 85, whereby the centered projection 85 in the embodiment shown is arranged in the holding space 16. In the bolted, symmetrical installed state, the centered hole 86 and the corresponding centered projection 85 serve to affix the load-distribution plate 20 with a positive fit on the bracket element 10 so as to prevent an undesired rotation of the load-distribution plate 20 relative to the bracket element 10. In addition or as an alternative, a stop can be provided for purposes of positioning the load-distribution plate 20 in the center of the bracket element 10.

Another embodiment of the invention is shown in FIG. 7. The embodiment in FIG. 7 differs from the embodiment in FIGS. 1 to 6 in that, according to FIG. 7, the counter-bearing element 14' is not configured as a catching element, but rather as a straight tab that forms a simple stop. The counter-bearing element 14' is open towards the bottom and does not secure the underside of the bracket element 10. In contrast, it is the catching element 13 that secures the bracket element 10, also towards the bottom since, at its lower end, it has a second leg 82 at an angle, something that is absent in the counter-bearing element 14'.

What is claimed is:

1. A conduit hanger comprising:
   at least one bracket for receiving a pipe, the bracket including a cylindrical inner surface a front face perpendicular to the cylindrical inner surface and a back face perpendicular to the cylindrical inner surface;
   a load-distribution plate placed into the bracket; and
   a fastener for fastening the load-distribution plate to the bracket, the fastener having at least one catch to grip the bracket and having a counter-bearing, the catch and the counter-bearing arranged offset on the load-distribution plate in a lengthwise direction of the plate and defining a holding space for the bracket, the front face and back face extending in a first direction perpendicular to the pipe, the front face having at least one recess corresponding to the catch and the back face having at least one recess corresponding to the counter-bearing so that at the bracket can be placed into the holding space, the catch fitting through the front face at the recess and the front face being grippable by the catch apart from the recess, the counter-bearing fitting through the back face at the recess and the back face being grippable by the counter-bearing apart from the recess, the catch being slidable along the front face and the counter-bearing being slidable along the back face for fastening the load-distribution plate to the bracket.

2. The conduit hanger as recited in claim 1 wherein the counter-bearing element is a second catch to grip the bracket, the bracket having a second face opposing the face, the second face having a second recess corresponding to the second catch.

3. The conduit hanger as recited in claim 1 wherein the catch or the counter-bearing are arranged in an apex area of the load-distribution plate.

4. The conduit hanger as recited in claim 1 wherein the catch and the counter-bearing lie on a line that runs in the lengthwise direction of the load-distribution plate.

5. The conduit hanger as recited in claim 1 wherein the catch and the counter-bearing are configured in one piece with the load-distribution plate.

6. The conduit hanger as recited in claim 1 wherein the bracket and the load-distribution plate have corresponding centerers.

7. A conduit hanger comprising:
   at least one bracket for receiving a pipe, the bracket having a first face perpendicular to the pipe and a second face opposing the first face, the bracket including a cylindrical inner surface, the first face being perpendicular to the cylindrical inner surface;
   a load-distribution plate placed into the bracket; and
   a fastener for fastening the load-distribution plate to the bracket, the fastener having at least one catch to grip the bracket at the first face and having a counter-bearing, the catch and the counter-bearing arranged offset on the load-distribution plate in a lengthwise direction of the plate and defining a holding space for the bracket, the first face having a recess, the catch fitting through the first face at the recess in a first position, the fastener being movable with respect to the first face from the first position to a second position, the first face being gripped by the catch away from the recess in the second position, the catch being slidable along the first face for fastening the load-distribution plate to the bracket.

8. The conduit hanger as recited in claim 7 wherein the counter-bearing element is a second catch to grip the bracket at the second face, the second face having a second recess through which the second catch fits.

9. The conduit hanger as recited in claim 7 wherein the catch or the counter-bearing are arranged in an apex area of the load-distribution plate.

10. The conduit hanger as recited in claim 7 wherein the catch and the counter-bearing lie on a line that runs in the lengthwise direction of the load-distribution plate.

11. The conduit hanger as recited in claim 7 wherein the catch and the counter-bearing are configured in one piece with the load-distribution plate.

12. The conduit hanger as recited in claim 7 wherein the bracket and the load-distribution plate have corresponding centerers.

13. The conduit hanger as recited in claim 7 wherein the bracket has a cylindrical inner contour matching the pipe.

14. The conduit hanger as recited in claim 7 wherein the bracket has a first bracket element and a second bracket element connected by a hinge.

15. The conduit hanger as recited claim 14 wherein the first bracket element and second bracket element are connected by a closure mechanism.

16. The conduit hanger as recited in claim 7 wherein the recess is spaced off center above a bottom of the bracket.

* * * * *